(12) United States Patent
Klinger

(10) Patent No.: US 7,465,148 B2
(45) Date of Patent: Dec. 16, 2008

(54) AIR-GUIDING SYSTEM BETWEEN COMPRESSOR AND TURBINE OF A GAS TURBINE ENGINE

(75) Inventor: Holger Klinger, Kleinmachnow (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 311 days.

(21) Appl. No.: 11/443,486

(22) Filed: May 31, 2006

(65) Prior Publication Data
US 2007/0089430 A1    Apr. 26, 2007

(30) Foreign Application Priority Data
May 31, 2005    (DE) .................. 10 2005 025 244

(51) Int. Cl.
F02C 7/00    (2006.01)
F02C 7/18    (2006.01)
G01D 3/00    (2006.01)

(52) U.S. Cl. .................. 415/107; 415/117; 415/180; 60/785

(58) Field of Classification Search ............ 415/107, 415/115, 116, 117, 170.1, 180; 60/782, 785, 60/806
See application file for complete search history.

(56) References Cited

U.S. PATENT DOCUMENTS

| | | | | |
|---|---|---|---|---|
| 3,989,410 A | * | 11/1976 | Ferrari | .................. 415/115 |
| 4,214,851 A | | 7/1980 | Tuley | |
| 4,466,239 A | * | 8/1984 | Napoli et al. | ............ 415/173.7 |
| 5,402,636 A | * | 4/1995 | Mize et al. | ................ 415/173.7 |
| 5,984,630 A | * | 11/1999 | Di Salle et al. | .......... 415/174.5 |
| 6,616,423 B2 | | 9/2003 | Bosen | |
| 6,722,138 B2 | * | 4/2004 | Soechting et al. | ............. 60/785 |
| 6,776,573 B2 | * | 8/2004 | Arilla et al. | ................. 415/115 |

FOREIGN PATENT DOCUMENTS

| | | |
|---|---|---|
| DE | 2915626 | 10/1979 |
| DE | 3014279 | 10/1981 |
| EP | 1281836 | 2/2003 |

\* cited by examiner

*Primary Examiner*—Igor Kershteyn
(74) *Attorney, Agent, or Firm*—Timothy J. Klima

(57) ABSTRACT

An air-guiding system between a compressor and a turbine of a gas turbine engine includes an air chamber (5) being delimited by the inner casing of the combustion chamber (4) and first and second seals (7, 8) towards the rotating compressor shaft cone (12). An axial thrust compensation chamber (6) is adjoined to said second seal (8) and respectively loaded with the turbine cooling air (B', C) branched-off from the compressor air. Due to the higher pressure in said axial thrust compensation chamber with respect to said air chamber, the high axial forces are compensated. The air flowing back into said air chamber through said second seal (8) is guided and separated from components (10) and flowing-off air masses by a flow-guiding means (16) in said air chamber. This results in a high rinsing effect, a reduced vortex formation and finally, a reduced thermal stress.

9 Claims, 3 Drawing Sheets

AIR-GUIDING SYSTEM BETWEEN COMPRESSOR AND TURBINE OF A GAS TURBINE ENGINE

This application claims priority to German Patent Application DE 10 2005 025 244.3 filed May 31, 2005, the entirety of which is incorporated by reference herein.

BACKGROUND OF THE INVENTION

The invention relates to an air-guiding system between compressor and turbine of a gas turbine engine operated with a high pressure ratio.

The performance of gas turbine engines can be improved, among other measures, by increasing the pressure ratio. Connected therewith are however, on the one hand, higher axial forces acting on the shaft bearing, said forces having to be compensated, and on the other hand there is a distinct temperature increase and a correspondingly high thermal stress of the components adjoined downstream to the compressor, in particular, of the compressor shaft cone and the inner casing of the combustion chamber enclosing the latter. Because of extensive vorticity zones between stationary casing and rotating shaft and the friction losses resulting therefrom, there is a further temperature increase of the air and consequently an increased thermal stress of the shaft portion between compressor and turbine and of the inner casing of the combustion chamber enclosing the latter. Furthermore, by the vortex structures, flowing-off of the air from the chamber is made difficult, and thus the air temperature and the thermal stress of the material are further increased and the expected life of the respective components is reduced.

Due to the high thermal stress and the shorter life caused thereby it is necessary to use cost-intensive, high heat resistant materials for the respective components. On the other hand, due to the conditions existing in the chamber between the inner casing of the combustion chamber and the shaft and the temperature increase resulting therefrom, there is only available cooling air having an increased temperature for the subsequent cooling of the high-pressure turbine.

It is the object of the present invention to provide a gas turbine engine operated at an increased pressure ratio with simultaneous axial thrust compensation such that the thermal stress in the air chamber formed between the high-pressure shaft and the inner casing of the combustion chamber and loaded with a cooling air flow is low and therefore cost-effective materials can be used. It is another object to reduce the consumption of cooling air and to thereby increase the efficiency of the engine and lower the fuel consumption.

BRIEF SUMMARY OF THE INVENTION

According to the invention, this object is achieved by an air-guiding system according to the features described herein. Suitable and advantageous embodiments of the invention are the subject matter of the description below.

The air-guiding system comprises an air chamber, which is delimited radially by the inner casing of the combustion chamber surrounding the compressor shaft cone of the high-pressure shaft and axially by one seal each arranged upstream and downstream toward the rotating compressor shaft cone. The portion of the compressor air introduced under pressure reduction at the first seal into the air chamber arrives over air exhaust ports provided downstream as a first turbine cooling air to the turbine. An axial thrust compensation chamber follows the second seal arranged downstream, in said axial thrust compensation chamber the higher pressure of a second cooling air flow branched-off from the compressor air being present, in order to compensate the high axial forces existing for a compressor operated at a high pressure ratio.

In order to reduce the temperature increase and thermal stress of the components of the air chamber occurring at the high compressor pressure ratio, the rear part of the air chamber comprises an axially extending flow-guiding means in the form of an air-guiding ring, which separates in the rear section of the air chamber the second turbine cooling air flowing in upstream through the seal gap into the front air chamber from the first turbine cooling air and also from the components extending into the air chamber. Thus, the higher axial thrust forces at an increased compressor pressure ratio are compensated, and the high thermal stress of the components of the air chamber is limited, since by the guided and separated introduction of the turbine cooling air having a higher pressure from the axial thrust compensation chamber into the air chamber an improved rinsing of the interspace formed between the rotating shaft and the stationary inner casing of the combustion chamber with simultaneous reduction of the vorticity is achieved. The expected life is increased, and cost-effective materials and less cooling air can be used.

In an embodiment of the invention, the air-guiding ring is configured such that the cooling air in the air chamber is guided through air passage ports or pockets, an annular gap or preferably the baffles of a guide vane ring to the air exhaust ports of the air chamber. Particularly advantageous is the arrangement of baffles staggered in the peripheral direction or of passage boreholes inclined with regard to the machine axis, since thereby the deflection of the rotating turbulences in an axial direction is achieved under lower losses to a higher total pressure.

In another embodiment of the invention, a covering ring may be assigned to the air-guiding ring for shielding the fixing means projecting into the air chamber against the flowing air mass. This covering ring may also completely cover the inner casing of the combustion chamber up to the fixing means, in order to thereby reduce the rotating air volume and simultaneously act as a heat protection. The air-guiding ring mentioned above is preferably configured in multiple parts, in order to secure the capability of assembly.

BRIEF DESCRIPTION OF THE DRAWINGS

Embodiments of the invention are explained in more detail with reference to the drawing. There are.

DETAILED DESCRIPTION OF THE INVENTION

Figure 1:
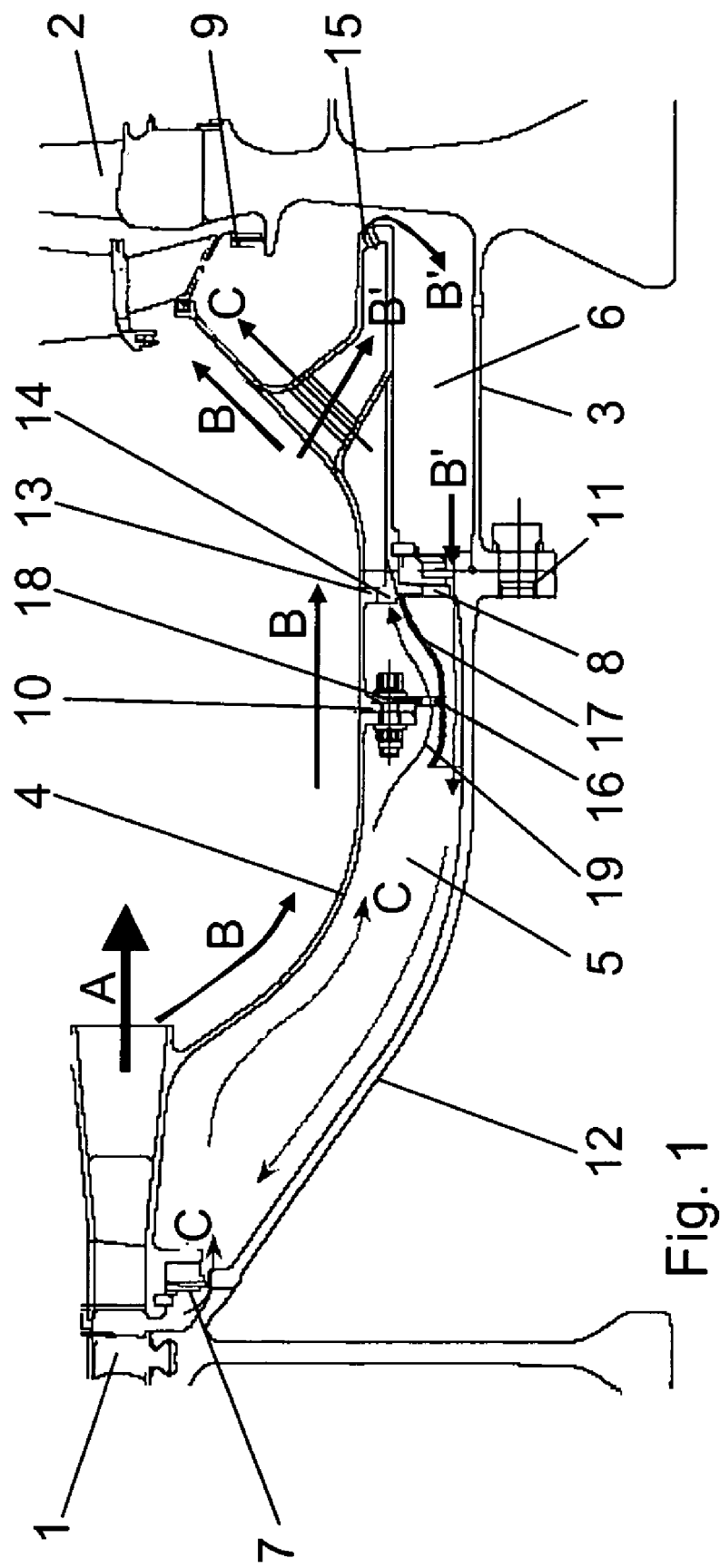
FIG. 1 a partial view of a gas turbine engine between compressor and turbine, comprising a flow-guiding means arranged in the chamber surrounded by the inner casing of the combustion chamber and loaded with compressor air.
Figure 5:
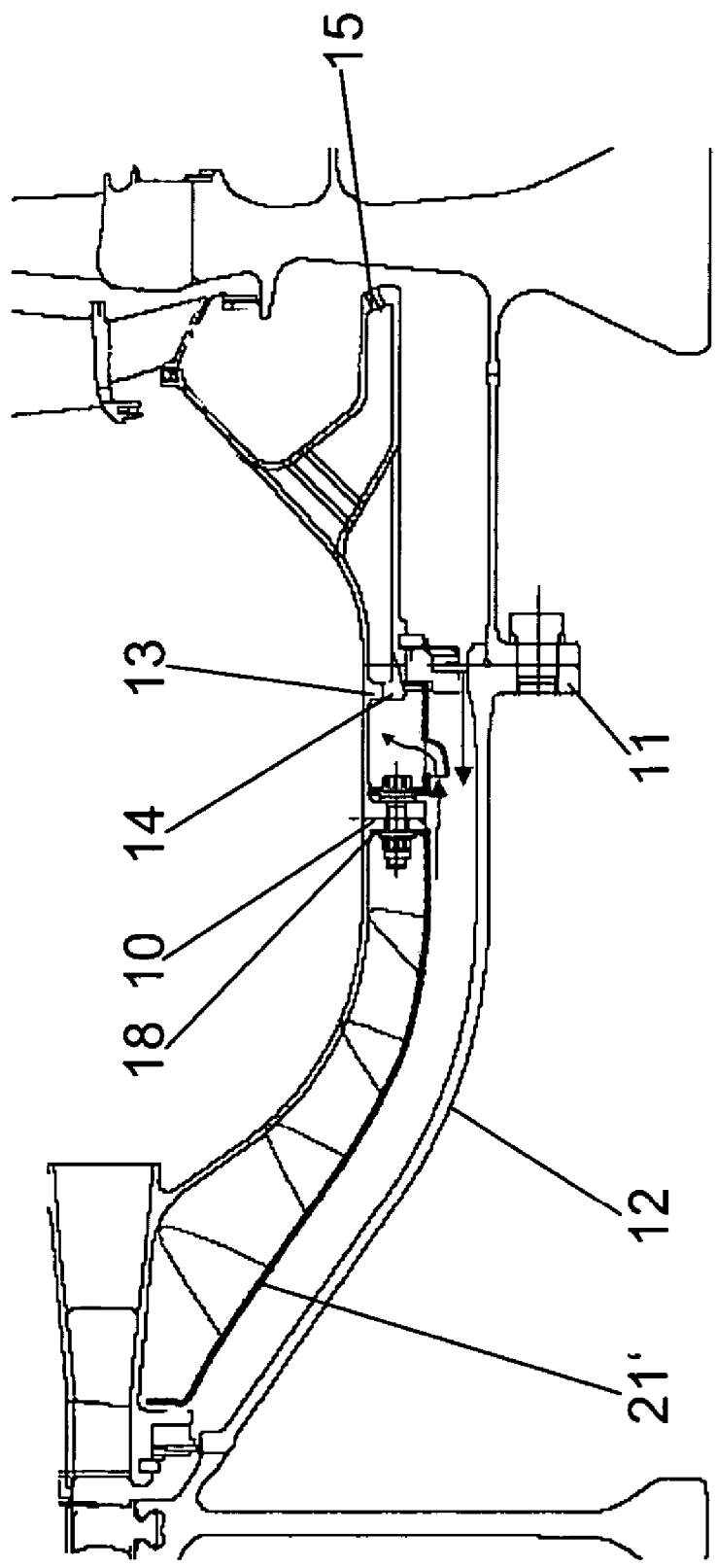
FIG. 5 the air chamber of FIG. 1 with a flow-guiding means of FIG. 2 and an additional flow-guiding means.

In the partial view of a gas turbine engine shown in FIGS. 1 and 5, the compressor 1 and the turbine 2 connected to one another by the shaft 3 and the inner casing of the combustion chamber 4 can be seen. The inner casing of the combustion chamber 4 encloses a two-part cavity extending along the shaft 3 between compressor 1 and turbine 2, said cavity comprising an air chamber 5 and an axial thrust compensation chamber 6 and being sealed from the shaft 3 rotating at a high speed by a first seal 7, a second seal 8 and a third seal 9. The two parts of the two-part inner casing of the combustion chamber 4 and 13 (support ring) are connected to one another by a flange connection 10 projecting into the air chamber 5. By another flange connection 11, the compressor shaft cone 12, in the area of which the air chamber 5 is located, is connected to the shaft 3.

According to the arrows shown in FIG. 1, a main portion (arrow A) of the pressurized air generated by the compressor reaches the combustion chamber (not shown). Another portion (arrow B) of the compressor air flows as cooling air within the inner casing of the combustion chamber 4 to the turbine 2, and another portion thereof (arrow B') to the pre-swirl nozzle 15 and thus also into the axial thrust compensation chamber 6, and from there along the second seal 8 also into air chamber 5 including the compressor shaft cone 12. Finally, another portion (arrow C) of the compressor air gets to the air chamber 5 (underneath the inner casing of the combustion chamber 4) and through air exhaust ports 14 provided at the periphery of a support ring 13 projecting away from the inner casing of the combustion chamber 4 as cooling air to the turbine 2. The air according to arrow B is taken out over the full compressor exit cross-section, namely at the mean compressor exit temperature, whereas the air according to arrow C is mainly taken out from the hot hub area behind the last rotor stage. The air according to arrow B is thus cooler than the air according to arrow A. In the axial thrust compensation chamber 6, the pressure is higher than in the air chamber 5, in order to thus compensate the large axial forces acting on the shaft, which are generated by the high pressure ratio of the compressor 1 selected for increasing the power of the engine.

The high pressure ratio and in addition the friction losses generated in the flow by the existence of extensive vorticity zones in the air chamber lead to a distinct temperature increase, which is counteracted by providing a flow-guiding means 16 in the air chamber 5. By means of the flow-guiding means 16 being located between the entry position of the air at the seal gap of the second seal 8 to the axial thrust compensation chamber 6 and the air exhaust ports 14, the flowing-in and flowing-off air masses rotating because of the rotation of the compressor shaft cone 12 are guided in a way that the vortex formation occurring in particular at the rear end of the air chamber 5 is reduced, and the complete air chamber 5 is rinsed to a stronger degree, and the parts projecting into the flow and also causing a vortex formation—for instance the flange connection 10—are covered. In spite of the high compressor pressure ratio and axial thrust compensation, the temperature in the area of the compressor shaft cone 12 and of the inner casing of the combustion chamber 4 can thus be kept at a level, which does not require the use of expensive materials and secures a long life.

In FIGS. 1 to 5 are shown different flow-guiding means 16 each arranged between the inner casing of the combustion chamber 4 and the compressor shaft cone 12 at the rear end of the air chamber 5—here at the flange connection 10—and in any case separating the air exhaust ports 14 from the air entry by the seal 8.

According to FIG. 1, the flow-guiding means 16 comprises an air-guiding ring 17, which is connected by a fixing flange 18 to the flange connection 10 of the inner casing of the combustion chamber 4. The air-guiding ring 17 guides the air flowing upstream through the seal gap of the seal 8 along the compressor shaft cone 12. This cooler air is driven upstream due to the pumping action from the centrifugal force of the rotating shaft 3 along the outside of the compressor shaft cone 12 and prevents a stronger heating-up of the shaft 3. In the fixing flange 10, a multitude of air passage ports 19—for instance elongated in the peripheral direction or inclined at an angle with respect to the machine axis—are provided, through which—and through the air exhaust ports 14—the air leaves the air chamber 5 in the direction of the turbine.

Figure 4:
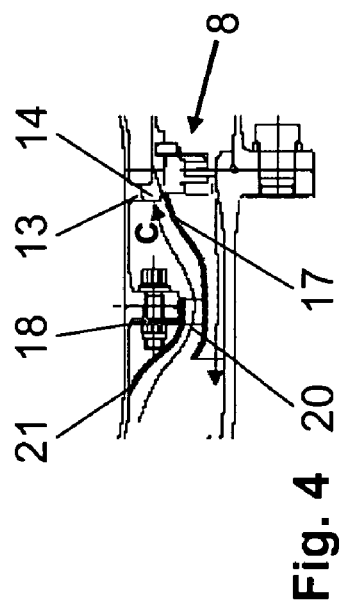
FIG. 4 a sectional view of a part of the air chamber with another embodiment of the flow-guiding means.

In still another embodiment shown in FIG. 4, guide means 20 are provided between the air-guiding ring 17 configured according to FIG. 1 and the fixing flange 18, so that the rotating air mass flow is deflected in a controlled way and at little loss, and a high total pressure level is maintained for subsequent consumers. The guide means 20 may be adapted as deflection vanes, simple deflection plates or through-holes inclined with regard to the machine axis.

In still another embodiment also shown in FIG. 4, a covering ring 21 is provided at the fixing flange 18, said covering ring 21 guiding the air to the air passage ports 19 or to the baffles 20 according to FIG. 4, and simultaneously reducing vortex formation and friction losses at the flange connection 10.

Figure 2:
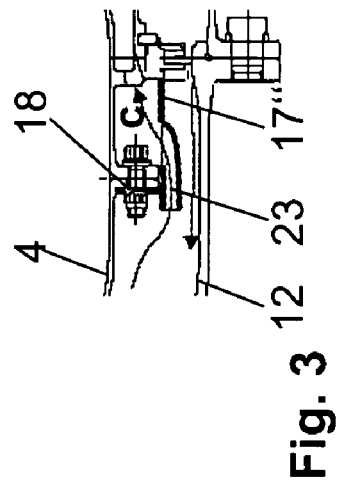
FIG. 2 a sectional view of a part of the air chamber with another embodiment of the flow-guiding means.
Figure 3:
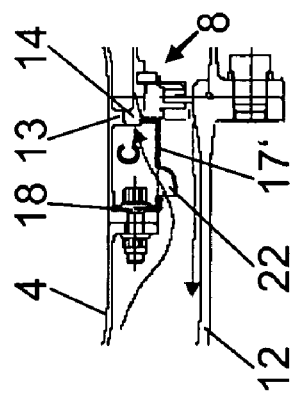
FIG. 3 a sectional view of a part of the air chamber with still another embodiment of the flow-guiding means.

According to FIG. 2, the flow-guiding means 16 comprises an air-guiding ring 17' arranged between the flange connection 10 and the flange 13, with said air passage pockets 22 being distributed at its periphery. In another embodiment according to FIG. 3, a circumferential annular gap 23 is provided at an air-guiding ring 17", namely on the one hand for guiding the air flowing back along the seal 8 along the compressor shaft cone 12 over the outer surfaces and on the other hand for exhausting air through the annular gap 23. In the embodiments of FIGS. 1, 2 and 3, too, a covering ring 21 may be provided at the fixing flange 18.

Still another embodiment of a covering ring 21' in conjunction with an air-guiding ring 17' according to FIG. 2 is shown in FIG. 5. The covering ring 21' arranged spaced to nearly the complete surface of the inner casing of the combustion chamber 4 and extending up to the flange connection 10 does not only cover the flange connection 10, but the inner casing of the combustion chamber 4 as a whole, and thus serves as a heat protection plate and for the reduction of the rotating air volume and of the thus caused power loss. The embodiments of the air-guiding rings 17 and 17" according to FIGS. 1, 3 and 4, too, may be combined with a covering ring 21' according to FIG. 5.

LIST OF REFERENCE NUMERALS 1 compressor
2 turbine
3 shaft
4 inner casing of the combustion chamber
5 air chamber
6 axial thrust compensation chamber
7 first seal
8 second seal
9 third seal
10 flange connection of 4
11 flange connection of 3
12 compressor shaft cone of 3
13 support ring of 4
14 air exhaust ports in 13
15 pre-swirl nozzle
16 flow-guiding means
17 air-guiding ring of 16 (17', 17")
18 fixing flange of 16
19 air passage ports in 18
20 guide means 21 covering ring (21')
22 air passage pockets of 17'
23 air passage gap of 17"
Arrow A compressor air for combustion chamber
Arrow B turbine cooling air above 4
Arrow C turbine cooling air underneath 4
Arrow B' turbine cooling air branched-off from B

The invention claimed is:

1. An air-guiding system between a compressor and a turbine of a gas turbine engine operated with a high pressure ratio, comprising:
   an air chamber adjoined to the compressor and passed through by a first turbine cooling air, said air chamber being delimited radially by an inner casing of a combustion chamber and a compressor shaft cone and axially by a first seal arranged upstream and a second seal arranged downstream,
   air exhaust ports spaced from a gap formed between the second seal and said compressor shaft cone,
   an axial thrust compensation chamber adjoined to said second seal and being loaded with a second turbine cooling air having a higher pressure, and
   flow-guiding means positioned in a rear portion of the air chamber, extending substantially axially and located between the seal gap of said second seal and said air exhaust ports.

2. An air-guiding system according to claim 1, wherein said flow-guiding means is a circumferential air-guiding ring positioned at the rear portion of said air chamber, which guides the second turbine cooling air flowing into the air chamber through the seal gap of said second seal from said axial thrust compensation chamber and along said compressor shaft cone and separates it from the first turbine cooling air flowing to said air exhaust ports and from a flange connection at said inner casing of the combustion chamber.

3. An air-guiding system according to claim 2, wherein said air-guiding ring is held by fixing flange at said flange connection, and that the air flow to said air exhaust ports takes place through air-guiding ports.

4. An air-guiding system according to claim 3, wherein said air-guiding ports are air passage ports provided in said fixing flange and being elongated in the peripheral direction.

5. An air-guiding system according to claim 3, wherein said air-guiding ports are formed by guide means in the form of at least one of profiled deflection vanes, simple deflection plates and through-holes inclined with regard to a machine axis, said guide means being provided between said fixing flange and said air-guiding ring and reducing flow losses.

6. An air-guiding system according to claim 3, wherein said air-guiding ports are formed by air passage pockets provided at said air-guiding ring.

7. An air-guiding system according to claim 3, wherein said air-guiding ports are formed by a circumferential annular gap provided at said air-guiding ring.

8. An air-guiding system according to claim 2, and further comprising a covering ring attached to said air-guiding ring, which shields said flange connection and said flange against said first turbine cooling air and guides the latter to said air-guiding ports.

9. An air-guiding system according to claim 2, and further comprising a covering ring connected to the inner casing and positioned upstream of said air-guiding ring, which is arranged spaced from said inner casing of the combustion chamber and covers the latter, and reduces the air chamber volume and guides said first turbine cooling air to said air-guiding ports.

* * * * *